United States Patent
Ito et al.

(10) Patent No.: US 9,957,421 B2
(45) Date of Patent: May 1, 2018

(54) SEALING TAPE, PHOSPHOR SHEET, LIGHTING DEVICE, LIQUID-CRYSTAL DISPLAY, METHOD FOR MANUFACTURING PHOSPHOR SHEET, AND SEALING METHOD

(71) Applicant: Dexerials Corporation, Shinagawa-ku, Tokyo (JP)

(72) Inventors: Yasushi Ito, Utsunomiya (JP); Tomomitsu Hori, Utsunomiya (JP); Teruo Hiyama, Utsunomiya (JP); Akihiro Yamazaki, Kanuma (JP); Yoshifumi Ueno, Shimotsuke (JP)

(73) Assignee: Dexerials Corporation, Shinagawa-ku, Tokyo (JP)

( * ) Notice: Subject to any disclaimer, the term of this patent is extended or adjusted under 35 U.S.C. 154(b) by 127 days.

(21) Appl. No.: 15/119,507

(22) PCT Filed: Feb. 5, 2015

(86) PCT No.: PCT/JP2015/000533
§ 371 (c)(1),
(2) Date: Aug. 17, 2016

(87) PCT Pub. No.: WO2015/125432
PCT Pub. Date: Aug. 27, 2015

(65) Prior Publication Data
US 2017/0009109 A1    Jan. 12, 2017

(30) Foreign Application Priority Data
Feb. 21, 2014 (JP) ................. 2014-032279

(51) Int. Cl.
*F21V 33/00* (2006.01)
*C09J 7/02* (2006.01)
(Continued)

(52) U.S. Cl.
CPC .............. *C09J 7/0296* (2013.01); *B32B 3/26* (2013.01); *B32B 3/266* (2013.01); *B32B 3/30* (2013.01);
(Continued)

(58) Field of Classification Search
CPC ........... F21V 9/16; G02F 2001/133614; B32B 2255/10; C09J 2201/20
See application file for complete search history.

(56) References Cited

U.S. PATENT DOCUMENTS

| 4,274,402 A | 6/1981 | Shippert |
| 4,702,788 A | 10/1987 | Okui |

(Continued)

FOREIGN PATENT DOCUMENTS

| JP | S60127379 A | 7/1985 |
| JP | H0374485 A | 3/1991 |

(Continued)

OTHER PUBLICATIONS

Mar. 24, 2015, International Search Report issued in the International Patent Application No. PCT/JP2015/000533.

(Continued)

*Primary Examiner* — Evan Dzierzynski
(74) *Attorney, Agent, or Firm* — Kenja IP Law PC

(57) ABSTRACT

Provided are a sealing tape that can prevent tape width misalignment, air bubble inclusion, and creasing even when the sealing tape is affixed in a folded state, a phosphor sheet using the same, a lighting device, a liquid-crystal display, a method for manufacturing a phosphor sheet, and a sealing method. The sealing tape (10) includes an adhesive layer (11), a gas barrier layer (12), a bonding layer (13), and a support film layer (14) laminated in stated order, and has an incision (15) into the support film layer (14) in a thickness direction. The incision (15) is located substantially centrally (Continued)

in a width direction and extends in a longitudinal direction. Accordingly, tape width misalignment, air bubble inclusion, and creasing can be prevented even when the sealing tape is affixed in a folded state.

17 Claims, 15 Drawing Sheets

(51) Int. Cl.
| | |
|---|---|
| B32B 3/26 | (2006.01) |
| C09J 201/00 | (2006.01) |
| F21V 9/16 | (2006.01) |
| G02F 1/1335 | (2006.01) |
| B32B 27/08 | (2006.01) |
| B32B 27/18 | (2006.01) |
| F21K 9/64 | (2016.01) |
| B32B 7/12 | (2006.01) |
| B32B 15/09 | (2006.01) |
| B32B 15/20 | (2006.01) |
| B32B 27/20 | (2006.01) |
| B32B 27/36 | (2006.01) |
| F21V 8/00 | (2006.01) |
| B32B 7/02 | (2006.01) |
| B32B 7/04 | (2006.01) |
| B32B 15/04 | (2006.01) |
| B32B 15/08 | (2006.01) |
| B32B 27/06 | (2006.01) |
| B32B 27/28 | (2006.01) |
| B32B 27/30 | (2006.01) |
| B32B 27/32 | (2006.01) |
| B32B 3/30 | (2006.01) |
| F21Y 115/10 | (2016.01) |
| C09J 133/00 | (2006.01) |

(52) U.S. Cl.
CPC .......... *B32B 7/02* (2013.01); *B32B 7/04* (2013.01); *B32B 7/12* (2013.01); *B32B 15/04* (2013.01); *B32B 15/08* (2013.01); *B32B 15/09* (2013.01); *B32B 15/20* (2013.01); *B32B 27/06* (2013.01); *B32B 27/08* (2013.01); *B32B 27/18* (2013.01); *B32B 27/20* (2013.01); *B32B 27/28* (2013.01); *B32B 27/286* (2013.01); *B32B 27/288* (2013.01); *B32B 27/30* (2013.01); *B32B 27/308* (2013.01); *B32B 27/32* (2013.01); *B32B 27/36* (2013.01); *C09J 7/29* (2018.01); *C09J 201/00* (2013.01); *F21K 9/64* (2016.08); *F21V 9/16* (2013.01); *F21V 9/30* (2018.02); *G02B 6/005* (2013.01); *G02F 1/133603* (2013.01); *G02F 1/133617* (2013.01); *B32B 2250/04* (2013.01); *B32B 2255/10* (2013.01); *B32B 2255/26* (2013.01); *B32B 2264/102* (2013.01); *B32B 2264/105* (2013.01); *B32B 2307/40* (2013.01); *B32B 2307/422* (2013.01); *B32B 2307/7242* (2013.01); *B32B 2307/7244* (2013.01); *B32B 2307/7246* (2013.01); *B32B 2307/732* (2013.01); *B32B 2405/00* (2013.01); *B32B 2457/00* (2013.01); *B32B 2457/20* (2013.01); *B32B 2457/202* (2013.01); *C09J 133/00* (2013.01); *C09J 2201/16* (2013.01); *C09J 2201/20* (2013.01); *C09J 2203/318* (2013.01); *C09J 2400/163* (2013.01); *C09J 2433/00* (2013.01); *C09J 2467/006* (2013.01); *F21Y 2115/10* (2016.08); *G02F 2001/133614* (2013.01); *G02F 2202/28* (2013.01)

(56) References Cited

U.S. PATENT DOCUMENTS

| | | | | |
|---|---|---|---|---|
| 2011/0002140 | A1* | 1/2011 | Tsukahara | G02B 5/0236 362/602 |
| 2011/0037926 | A1* | 2/2011 | Tsukahara | G02B 6/0023 349/64 |
| 2014/0329063 | A1* | 11/2014 | Shinoda | C08J 7/04 428/201 |
| 2015/0086778 | A1* | 3/2015 | Ryu | B05D 1/38 428/336 |

FOREIGN PATENT DOCUMENTS

| | | |
|---|---|---|
| JP | H0658440 B2 | 8/1994 |
| JP | 2003261841 A | 9/2003 |
| JP | 2005108635 A | 4/2005 |
| JP | 2006126109 A | 5/2006 |
| JP | 2008158262 A | 7/2008 |
| JP | 2008303647 A | 12/2008 |
| JP | 2009283438 A | 12/2009 |
| JP | 2009283441 A | 12/2009 |
| JP | 2011013567 A | 1/2011 |
| JP | 2012057065 A | 3/2012 |
| JP | 2013047324 A | 3/2013 |
| WO | 2013111773 A1 | 8/2013 |
| WO | 2014203874 A1 | 12/2014 |

OTHER PUBLICATIONS

Jul. 12, 2017, Extended European Search Report issued by the European Patent Office in the corresponding European Patent Application No. 15752725.0.

* cited by examiner

SEALING TAPE, PHOSPHOR SHEET, LIGHTING DEVICE, LIQUID-CRYSTAL DISPLAY, METHOD FOR MANUFACTURING PHOSPHOR SHEET, AND SEALING METHOD

CROSS-REFERENCE TO RELATED APPLICATION

The present application claims priority of Japanese Patent Application No. 2014-32279 (filed on Feb. 21, 2014), the entire disclosure of which is incorporated into the present application by reference.

TECHNICAL FIELD

The present disclosure relates to a sealing tape that blocks water vapor, a phosphor sheet in which the sealing tape is used, a lighting device, a liquid-crystal display, a method for manufacturing a phosphor sheet, and a sealing method.

BACKGROUND

A backlight-type light source is used in a liquid-crystal display in order to irradiate a liquid-crystal panel from the back to a front surface thereof. In recent years, in accompaniment to trends toward larger, thinner, lighter, and longer life liquid-crystal displays, and from a viewpoint of improving video properties of such liquid-crystal displays through on/off control, there has been much interest in light-emitting devices that perform surface light emission through an array of light-emitting diodes (LEDs) mounted on a substrate. Extraction of white light from such light-emitting devices is mainly carried out by the following two methods.

The first of these methods involves providing LEDs that emit light of three colors, R, G, and B, and turning on these LEDs simultaneously such that white light is obtained as a composite of light of these three colors. The second of these methods involves, for example, encapsulating a blue LED in a phosphor-containing resin such that white light is obtained through color conversion of blue light. The structure composed by encapsulation of the blue LED in the phosphor-containing resin is referred to as a "white LED."

However, the first method is expensive because LEDs of three colors, R, G, and B, are required. On the other hand, potting with the phosphor-containing resin in the second method is carried out against an extremely small LED surface area, which makes it difficult to uniformly form the phosphor-containing resin without unevenness.

For this reason, in recent years there has been interest in a third method that can be used in place of the second method and that involves performing color conversion with respect to blue LEDs using a structure in which a phosphor-containing resin is sandwiched between sheet substrates or a phosphor-containing sheet formed by processing a phosphor-containing resin into a sheet shape (for example, refer to PTL 1 and 2).

Phosphors are vulnerable to oxygen and water vapor. For example, although sulfide phosphors such as $SrGa_2S_4$:Eu, CaS:Eu, and SrS:Eu are excellent phosphor materials that can be used to reproduce a wide color gamut due to their sharp emission spectra and $(Ba,Sr)_3SiO_5$:Eu can be used as an orange light-emitting phosphor material having high brightness, degradation of these phosphors due to water vapor readily occurs in a high temperature and high humidity environment.

Therefore, it is necessary to provide a means for blocking water vapor when using these phosphors. Although it is difficult to adopt these phosphors in white LEDs, in the case of the aforementioned third method, the problem described above can be dealt with by, for example, covering a phosphor layer with a water vapor barrier film. Examples of such methods that have been proposed include a method in which a protective layer of a silicon compound or the like is provided on a phosphor-containing resin (refer to PTL 3) and a method in which a water vapor barrier layer is formed on the surface of a phosphor-containing resin (refer to PTL 4 and 5).

A pouch structure such as illustrated in FIG. 14 may for example be adopted as a strategy for preventing infiltration of moisture at an edge. In the pouch structure, a phosphor layer 123 is sandwiched between a first film 101 and a second film 102, is further sandwiched between a first water vapor barrier film 121 and a second water vapor barrier film 122 disposed outward of the first film 101 and the second film 102, and is sealed by a sealing resin 103. The pouch structure has a large number of layers and cannot be easily manufactured.

Alternatively, a tape sealing structure such as illustrated in FIG. 15 may be adopted. In the tape sealing structure, a phosphor layer 123 is sandwiched between a first water vapor barrier film 121 and a second water vapor barrier film 122, and edges of the first water vapor barrier film 121 and the second water vapor barrier film 122 are sealed by a sealing tape 130. The sealing tape structure has a small number of layers and can be easily manufactured. Examples of materials that can be used as this tape include aluminum foil, which is a good option for use as this tape, and other materials having water vapor permeability of no greater than 1 $g/m^2$/day (40° C. and 90% RH) such as PET (polyethylene terephthalate) vapor deposited on silica.

CITATION LIST

Patent Literature

PTL 1: JP 2005-108635 A
PTL 2: JP 2009-283438 A
PTL 3: JP H6-58440 B
PTL 4: JP 2009-283441 A
PTL 5: JP 2011-13567 A

SUMMARY

Technical Problem

However, when a conventional sealing tape is affixed in a folded state, tape width misalignment, air bubble inclusion, creasing, or the like may cause deficient edge sealing.

In consideration of the situation described above, the present disclosure provides a sealing tape that can prevent tape width misalignment, air bubble inclusion, and creasing even when the sealing tape is affixed in a folded state, and also provides a phosphor sheet in which this sealing tape is used, a lighting device, a liquid-crystal display, a method for manufacturing a phosphor sheet, and a sealing method.

Solution to Problem

In order to solve the problem described above, a sealing tape according to the present disclosure includes an adhesive layer, a gas barrier layer, a bonding layer, and a support film layer laminated in stated order, and has an incision into the support film layer in a thickness direction. The incision is located substantially centrally in a width direction and extends in a longitudinal direction.

A phosphor sheet according to the present disclosure includes a first water vapor barrier film, a second water vapor barrier film, a phosphor layer sandwiched between the first water vapor barrier film and the second water vapor barrier film, and a sealing tape sealing edges of the first water vapor barrier film and the second water vapor barrier film. The sealing tape includes an adhesive layer, a gas barrier layer, a bonding layer, and a support film layer laminated in stated order, and has an incision into the support film layer in a thickness direction. The incision is located substantially centrally in a width direction and extends in a longitudinal direction.

A lighting device according to the present disclosure includes the phosphor sheet described above.

A liquid-crystal display according to the present disclosure includes the phosphor sheet described above.

A method for producing a phosphor sheet according to the present disclosure includes sandwiching a phosphor layer between a first water vapor barrier film and a second water vapor barrier film, and affixing a sealing tape to edges of the first water vapor barrier film and the second water vapor barrier film. The sealing tape includes an adhesive layer, a gas barrier layer, a bonding layer, and a support film layer laminated in stated order, and has an incision into the support film layer in a thickness direction. The incision is located substantially centrally in a width direction and extends in a longitudinal direction.

A sealing method according to the present disclosure includes affixing a sealing tape to edges of a first film and a second film. The sealing tape includes an adhesive layer, a gas barrier layer, a bonding layer, and a support film layer laminated in stated order, and has an incision into the support film layer in a thickness direction. The incision is located substantially centrally in a width direction and extends in a longitudinal direction.

Advantageous Effect

According to the present disclosure, tape width misalignment, air bubble inclusion, and creasing can be prevented, even when the sealing tape is affixed in a folded state, as a result of the sealing tape having the incision into the support film layer in the thickness direction that is located substantially centrally in the width direction and extends in the longitudinal direction.

DETAILED DESCRIPTION

A detailed description of embodiments of the present disclosure is provided in the following order with reference to the drawings.

1. Sealing tape
2. Phosphor sheet
3. Lighting device
4. Examples

1. Sealing Tape

Figure 1:
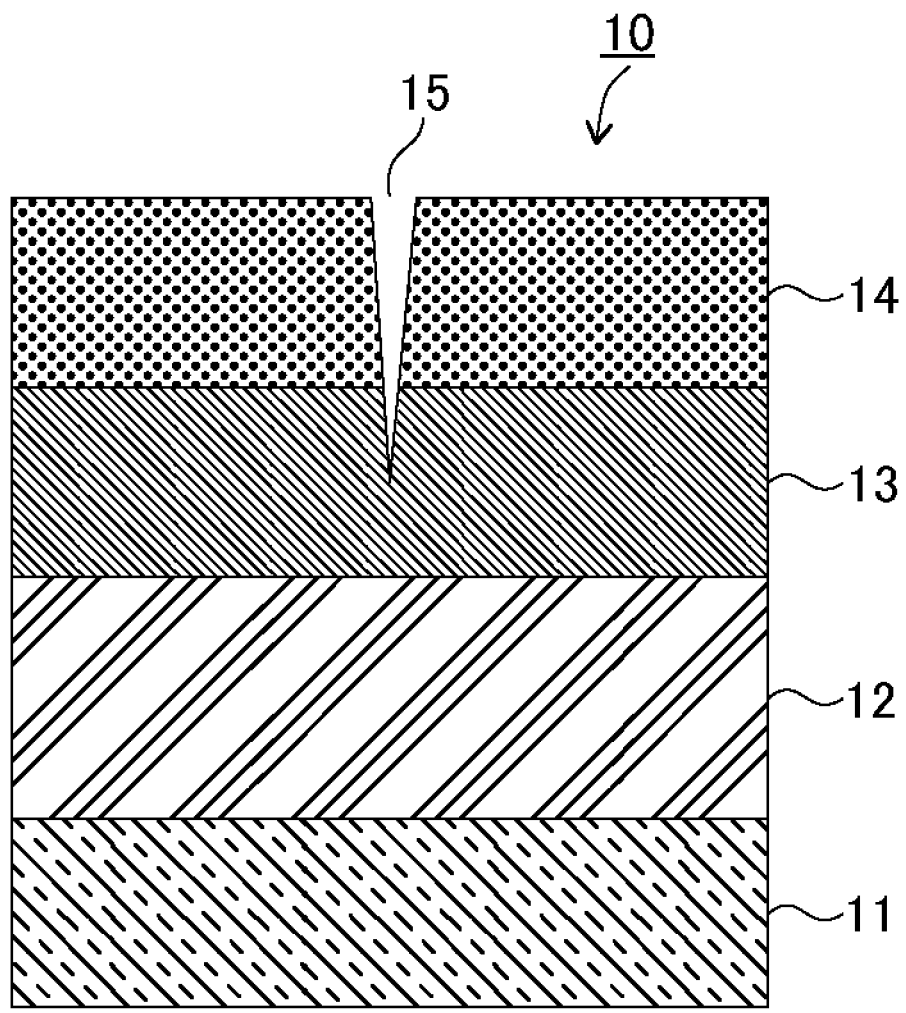
FIG. 1 is a cross-sectional view illustrating configuration of a sealing tape according to a present embodiment.

FIG. 1 is a cross-sectional view illustrating configuration of a sealing tape according to a present embodiment. The sealing tape 10 includes an adhesive layer 11, a gas barrier layer 12, a bonding layer 13, and a support film layer 14 laminated in stated order, and has an incision 15 into the support film layer 14 in a thickness direction. The incision 15 is located substantially centrally in a width direction and extends in a longitudinal direction. As a result, the support film layer 14 can be folded at a fixed position and upward/downward width misalignment, air bubble inclusion, and creasing can be prevented even when the sealing tape 10 is affixed in a folded state.

Note that the incision 15 located substantially centrally in the width direction and extending in the longitudinal direction may pass entirely through the support film layer 14 in the thickness direction. Furthermore, the incision 15 located substantially centrally in the width direction and extending in the longitudinal direction may pass partway through the bonding layer 13 in the thickness direction. Accordingly, the support film layer 14 can be easily folded at a fixed position and sealing workability can be improved.

The adhesive layer 11 is a layer that is affixed to an adherend. An adhesive or bonding agent forming the adhesive layer 11 can be selected as appropriate depending on the material of the adherend. For example, the adhesive layer 11 can be formed using an adhesive mainly containing an acrylic resin, an acrylic-modified silicone resin compound, a silicone-modified acrylic resin compound, or the like.

The gas barrier layer 12 is a layer that has strong gas barrier properties with respect to at least water vapor and oxygen and is for example a substrate having water vapor permeability of no greater than 1 g/m$^2$/day (40° C. and 90% RH). Although the gas barrier layer 12 may for example be a single aluminum layer, the gas barrier layer 12 preferably includes an aluminum layer, a bonding layer, a substrate, a bonding layer, and an aluminum layer laminated in stated order. Curling may occur in situation in which an aluminum layer and a support film have a large extension and contraction ratio. However, curling can be restricted and sealing workability can be improved through symmetrical lamination of aluminum layers.

A metal oxide such as silica or alumina may be used instead of aluminum such that the gas barrier layer 12 includes a metal oxide layer, a bonding layer, a substrate, a bonding layer, and a metal oxide layer laminated in stated order.

The bonding layer 13 is for example composed of an ultraviolet curable resin or a thermoplastic resin. The bonding layer 13 has good transparency and is sufficiently adhesive with respect to the gas barrier layer 12 and the support film layer 14. No specific limitations are place on the ultraviolet curable resin or the thermoplastic resin, which can be a commonly known material. Examples of ultraviolet curable resins that can be used include acrylic resins and epoxy resins that are polymerized by photocuring agents. Examples of thermoplastic resins that can be used include acrylic resins, PS resins (polystyrene resins), AS resins (styrene-acrylonitrile copolymer resins), MS resins (styrene-methyl methacrylate copolymer resins), and SBC resins (styrene-butadiene block copolymer resins). Among these examples, a thermoplastic acrylic resin having excellent transparency is preferably used.

The bonding layer 13 preferably contains a phosphor. Although no specific limitations are placed on the phosphor, the phosphor is preferably a YAG phosphor or a nitride phosphor that is strongly resistant to moisture. In particular, a yellow YAG phosphor such as $(Y,Gd)_3(Al,Ga)_5O_{12}:Ce$ (YAG:Ce) is preferable in a situation in which white light is to be obtained using a blue LED. By using the sealing tape at the edge of a phosphor sheet, a problem of bluish appearance near the edge of the phosphor sheet can be resolved.

The thickness of the bonding layer 13 is preferably at least 10 μm and no greater than 50 μm in order to prevent an incision from being made as far as the gas barrier layer 12.

The support film layer 14 is composed of a transparent plastic film that has a certain degree of stiffness. Specific examples that may be selected as appropriate depending on the intended use include non-stretched and stretched films of polyesters (for example, polyethylene terephthalate, polyethylene naphthalate, and polybutylene terephthalate), polyolefins (polyethylene, polypropylene), polyarylates, polycarbonates, polyacrylates, polyethersulfones, and copolymers of any of the preceding examples.

If the support film layer 14 is too thin, an appropriate degree of stiffness cannot be obtained, whereas if the support film layer 14 is too thick, the tape thickness increases. Accordingly, the thickness of the support film layer 14 is preferably at least 10 μm and no greater than 50 μm.

Through the sealing tape 10 configured as described above, a problem of tape width misalignment at the edge of an adherend when the sealing tape 10 is affixed in a folded state can be resolved because the folding position of the sealing tape 10 is fixed. Moreover, hardness of the support film layer 14 at the outermost surface can prevent air bubble inclusion and can restrict creasing caused by bending of the adherend. Furthermore, the gas barrier layer 12 can be protected from mechanical damage because the support film layer 14 is present at the outermost surface.

2. Phosphor Sheet

Figure 2:
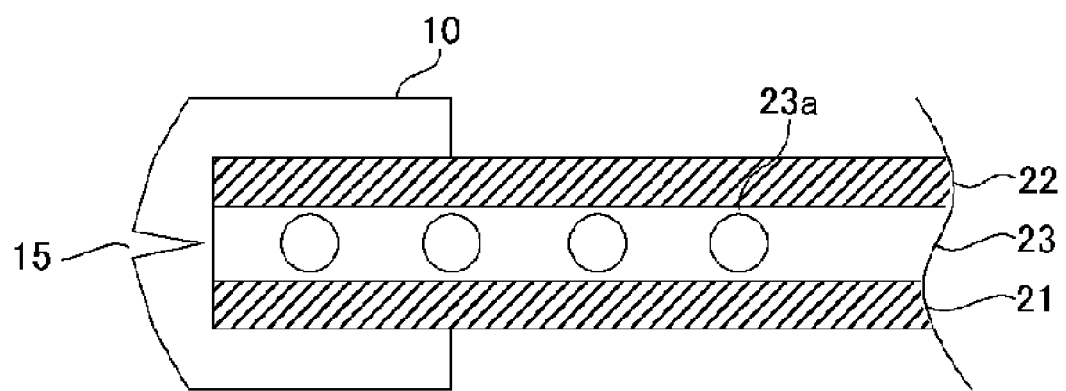
FIG. 2 is a cross-sectional view illustrating an example of configuration at an edge of a phosphor sheet.

FIG. 2 is a cross-sectional view illustrating an example of configuration at an edge of a phosphor sheet. The phosphor sheet includes a first water vapor barrier film 21, a second water vapor barrier film 22, a phosphor layer 23 sandwiched between the first water vapor barrier film 21 and the second water vapor barrier film 22, and the previously described sealing tape 10 sealing edges of the first water vapor barrier film 21 and the second water vapor barrier film 22.

From a viewpoint of strength and water vapor barrier properties, the width of the sealing tape 10 affixed onto the first water vapor barrier film 21 or the second water vapor barrier film 22 is preferably from 1 mm to 10 mm, and more preferably from 4 mm to 8 mm.

Through the phosphor sheet having the configuration described above, infiltration of water vapor into the phosphor layer 23 at the edges of the water vapor barrier films can be prevented and thus degradation of a phosphor 23a in the phosphor layer 23 can be prevented.

The first water vapor barrier film 21 and the second water vapor barrier film 22 are for example each a substrate having water vapor permeability of no greater than 1 g/m²/day. For example, the first water vapor barrier film 21 and the second water vapor barrier film 22 may each be a film having gas barrier properties in which a thin film of a metal oxide such as aluminum oxide, magnesium oxide, or silicon oxide is disposed on the surface of a film or a base plate made from a plastic such as PET (polyethylene terephthalate). Alternatively, the first water vapor barrier film 21 and the second water vapor barrier film 22 may each have a multilayer structure such as a PET/$SiO_x$/PET structure.

The phosphor layer 23 is a film formed from a resin composition containing the phosphor 23a in a powder state. Although no specific limitations are placed on the phosphor, the phosphor may for example be one or a combination of two or more of a sulfide phosphor, an oxide phosphor, a nitride phosphor, a fluoride phosphor, or the like depending on the phosphor type, the absorption region, the emission region, and so forth.

Specific examples of sulfide phosphors that can be used include CaS:Eu, SrS:Eu, $SrG_2S_4$:Eu, $CaGa_2S_4$:Eu, (Sr,Ca,Ba,Mg)$Ga_2S_4$:Eu, (Sr,Ca,Ba)S:Eu, $Y_2O_2S$:Eu, $La_2O_2S$:Eu, and $Gd_2O_2S$:Eu. Specific examples of oxide phosphors that can be used include $(Ba,Sr)_3SiO_5$:Eu, $(Ba,Sr)_2SiO_4$:Eu, $Tb_3Al_5O_{12}$:Ce, and $Ca_3Sc_2Si_3O_{12}$:Ce. Specific examples of nitride phosphors that can be used include $Ca_2Si_5N_8$:Eu, $Sr_2Si_5N_8$:Eu, $Ba_2Si_5N_8$:Eu, $(Ca,Sr,Ba)_2Si_5N_8$:Eu, $Ca_x(Al,Si)_{12}(O,N)_{16}$:Eu (0<x≤1.5), $CaSi_2O_2N_2$:Eu, $SrSi_2O_2N_2$:Eu, $BaSi_2O_2N_2$:Eu, (Ca, Sr,Ba)$Si_2O_2N_2$:Eu, $CaAl_2Si_4N_8$:Eu, $CaSiN_2$:Eu, and $CaAlSiN_3$:Eu. Specific examples of fluoride phosphors that can be used include $K_2TiF_6$:$Mn^{4+}$, $Ba_2TiF_6$:$Mn^{4+}$, $Na_2TiF_6$:$Mn^{4+}$, $K_3ZrF_7$:$Mn^{4+}$, and $K_2SiF_6$:$Mn^{4+}$. Examples of other phosphors that can be used include YAG phosphors such as $(Y,Gd)_3(Al,Ga)_5O_{12}$:Ce (YAG:Ce) and SiAlON phosphors such as $Lu(Si,Al)_{12}(O,N)_{16}$:Eu. Note that in the denotation of these phosphor materials, the part before the colon indicates the host material and the part after the colon indicates the activator.

Examples of phosphors that can be combined in order to obtain white light using a blue LED or a near ultraviolet LED include a yellow phosphor, a yellow phosphor with a red phosphor, and a green phosphor with a red phosphor. In the present embodiment, sulfide phosphors, oxide phosphors, and mixed phosphors thereof that are susceptible to degradation by water vapor can be favorably used and a wide color gamut can be reproduced.

Examples of sulfide phosphors that can be combined in order to obtain white light using a blue LED include sulfide phosphors that exhibit a red fluorescence peak at a wavelength of from 620 nm to 660 nm upon irradiation with blue excitation light, with CaS:Eu and SrS:Eu being preferable, and sulfide phosphors that exhibit a green fluorescence peak at a wavelength of from 530 nm to 550 nm upon irradiation with blue excitation light, with $SrGa_2S_4$:Eu being preferable.

Examples of oxide phosphors that can be combined in order to obtain white light using a blue LED include oxide phosphors that exhibit red fluorescence of a wavelength of from 590 nm to 620 nm upon irradiation with blue excitation light, with $(Ba,Sr)_3SiO_5$:Eu and $(Ba,Sr)_2SiO_4$:Eu being preferable.

Note that besides the sulfide phosphors or oxide phosphors combined in order to obtain white light using a blue LED, other phosphors such as $(Y,Gd)_3(Al,Ga)_5O_{12}$:Ce or a SiAlON phosphor may be used.

The surface of a sulfide phosphor or an oxide phosphor is preferably coated. Examples of compounds that can be used for this surface coating include oxides such as silicon oxide, yttrium oxide, aluminum oxide, and lanthanum oxide. Any one of these examples or a combination of any two or more of these examples may be used.

In a situation in which a mixture of phosphors such as described above is used as the phosphor in a single layer-type light-emitter sheet illustrated in FIG. 2, in order that the phosphor sheet emits white light, it is preferable to use a mixed phosphor including: a sulfide phosphor that emits red fluorescence of a wavelength of from 620 nm to 660 nm upon irradiation with blue excitation light or an oxide phosphor that emits red fluorescence of a wavelength of from 590 nm to 620 nm upon irradiation with blue excitation light; and a sulfide phosphor that emits green fluorescence of a wavelength of from 530 nm to 550 nm upon irradiation with blue excitation light. A particularly preferable combination is a mixed phosphor including: CaS:Eu or $(BaSr)_3SiO_5$:Eu that emits red fluorescence; and $SrGa_2S_4$:Eu that emits green fluorescence.

The resin composition forming the phosphor layer preferably includes either or both of a polyolefin copolymer component and a photocurable (meth)acrylic resin component.

Examples of the polyolefin copolymer include styrene copolymers and hydrogenated products thereof. Preferable examples of styrene copolymers and hydrogenated products thereof that can be used include styrene-ethylene-butylene-styrene block copolymers and hydrogenated products thereof, and styrene-ethylene-propylene block copolymers and hydrogenated products thereof. Among these example, a hydrogenated product of a styrene-ethylene-butylene-styrene block copolymer is particularly preferable in terms of transparency and gas barrier properties. Excellent light stability and low water absorbency can be obtained as a result of inclusion of a polyolefin copolymer component such as described above.

Examples of the photocurable acrylate resin component include urethane (meth)acrylates, polyester (meth)acrylates, and epoxy (meth)acrylates. Among these examples, a urethane (meth)acrylate is preferable from a viewpoint of heat stability after photocuring. Excellent light stability and low water absorbency can be obtained as a result of inclusion of a photocurable (meth)acrylate resin component such as described above.

The resin composition may include another light-transmitting resin, a color pigment, a solvent, or the like, as required, to the extent that the effects of the present disclosure are not lost.

[Method for Manufacturing Phosphor Sheet]

A method for manufacturing a phosphor sheet according to a present embodiment includes sandwiching a phosphor layer between a first water vapor barrier film and a second water vapor barrier film, and sealing edges of the first water vapor barrier film and the second water vapor barrier film using the previously described sealing tape.

Figure 3:
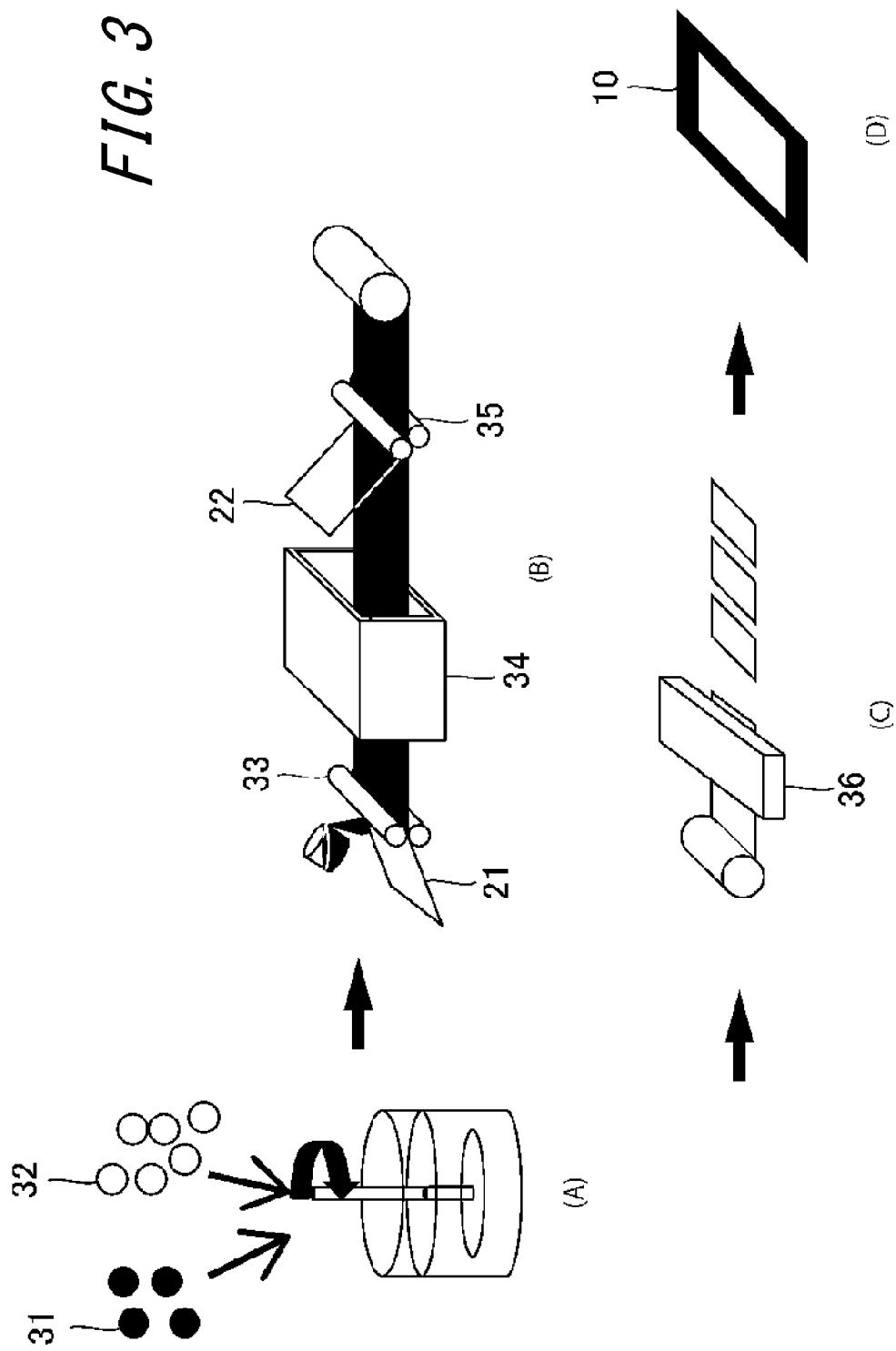
FIG. 3 is a schematic diagram illustrating an example of a method for manufacturing a phosphor sheet.

FIG. 3 is a schematic diagram illustrating an example of the method for manufacturing the phosphor sheet. The method for manufacturing the phosphor sheet illustrated in FIG. 3, which is provided as a specific example, includes a stirring step (A), a lamination step (B), a punching step (C), and a sealing step (D).

In the stirring step (A), a phosphor-containing resin paste is obtained by, for example, mixing a predetermined blending ratio of a red phosphor 31 and a green phosphor 32 into a resin paste that has been dissolved using a solvent. In the lamination step (B), a phosphor layer 23 is formed by applying the phosphor-containing resin paste onto a first water vapor barrier film 21, adjusting the phosphor-containing resin paste to a uniform film thickness using a bar coater 33, and drying the phosphor-containing resin paste in an oven 34. Thereafter, a second water vapor barrier film 22 is affixed onto the phosphor layer 23 using a thermal laminator 35 in order to obtain a phosphor sheet web in which the phosphor layer 23 is sandwiched between the first and second water vapor barrier films 21 and 22. In the punching step (C), the phosphor sheet web is punched using a pressing machine 36 to obtain a phosphor sheet of a specific size having a side surface at the edge thereof at which the phosphor layer is exposed. In the sealing step (D), the phosphor layer 23 is sealed by affixing the previously described sealing tape 10 to an edge of the first water vapor barrier film 21 and an edge of the second water vapor barrier film 22.

Through the steps (A) to (D) described above, a phosphor sheet can be obtained in which the sealing tape 10 is affixed to the edges of the first and second water vapor barrier films 21 and 22.

The previously described sealing tape is not limited to use in a method for manufacturing a phosphor sheet and can also be used in a sealing method in which the sealing tape is affixed to edges of a first film and a second film.

3. Lighting Device

Figure 4:
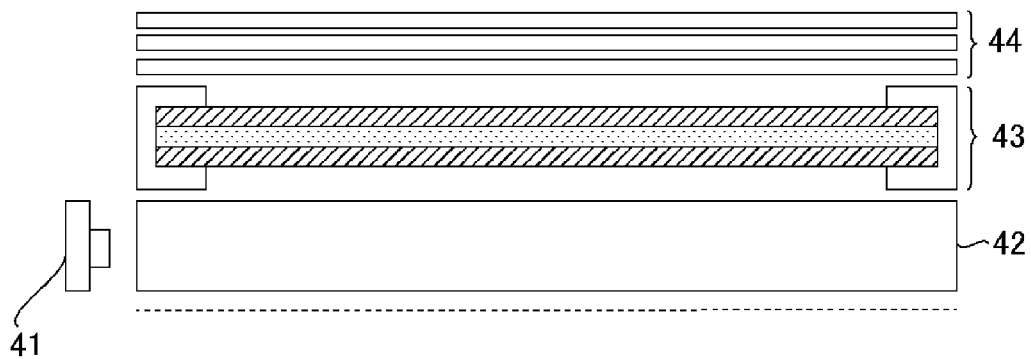
FIG. 4 is a schematic cross-sectional view illustrating an edge-type lighting device.

FIG. 4 is a schematic cross-sectional view illustrating an edge-type lighting device. As the illustrated in FIG. 4, the lighting device is what may be referred to as an "edge-type backlight" and includes blue LEDs 41, a light guide plate 42 that emits light uniformly from a surface thereof through diffusion of blue light from the blue LEDs 41 that is incident on a side surface thereof, a phosphor sheet 43 used to obtain white light from the blue light, and an optical film group 44.

The blue LEDs 41 form what may be referred to as an "LED package" that for example includes InGaN LED chips as blue light-emitting elements. The light guide plate 42 is for example a transparent substrate, such as an acrylic plate, that uniformly emits light that is incident on a side surface thereof by surface light emission. The phosphor sheet 43 contains a powder-state phosphor used to obtain white light from blue light emitted by the blue light-emitting elements. The powder of the phosphor has an average particle diameter on the scale of micrometers to tens of micrometers. Accordingly, light scattering effectiveness of the phosphor sheet 43 can be improved. The optical film group 44 for example includes a diffusion film and a reflective polarizing film for improving visibility of a liquid-crystal display.

Figure 5:
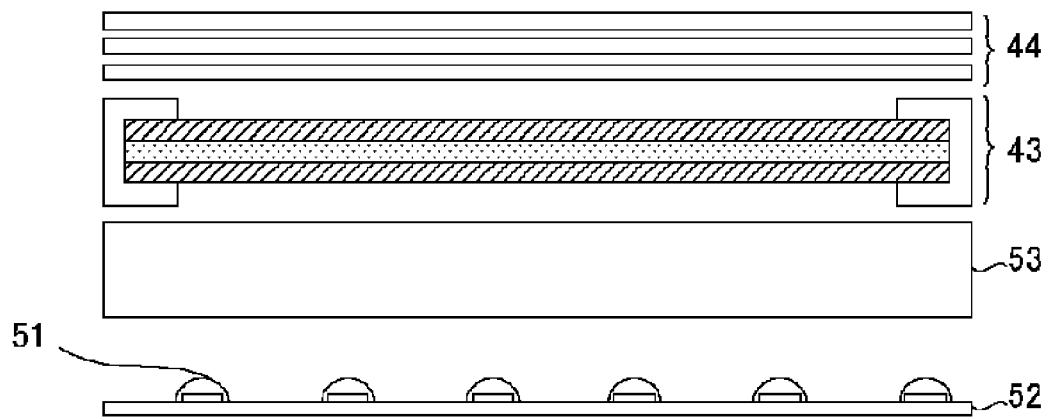
FIG. 5 is a schematic cross-sectional view illustrating a direct-type lighting device.

FIG. 5 is a schematic cross-sectional view illustrating a direct-type lighting device. As illustrated in FIG. 5, the lighting device is what may be referred to as a "direct-type backlight" and includes a substrate 52 having a two-dimensional array of blue LEDs 51, a diffusion plate 53 that causes diffusion of blue light emitted from the blue LEDs 51, a phosphor sheet 43 that is separated from the substrate 52 and through which white light is obtained from the blue light, and an optical film group 44.

The blue LEDs 51 form what may be referred to as an "LED package" that for example includes InGaN LED chips as blue light-emitting elements. The substrate 52 is made from a glass cloth substrate material in which a resin such as a phenolic resin, an epoxy resin, or a polyimide resin is used. The blue LEDs 51 are arranged at equal intervals with a specific pitch on the substrate 52 such as to be in a two-dimensional array that corresponds to the entire surface of the phosphor sheet 43. Note that a surface of the substrate 52 on which the blue LEDs 51 are mounted may be subjected to reflection treatment as required. The substrate 52 and the phosphor sheet 43 are separated by approximately 10 mm to 50 mm such that the lighting device has what may be referred to as a "remote phosphor structure." A gap between the substrate 52 and the phosphor sheet 43 is maintained by a plurality of support columns or a reflector plate, and the support columns or reflector plate are disposed such as to surround a space formed by the substrate 52 and the phosphor sheet 43 on four sides. The diffusion plate 53 causes light emitted from the blue LEDs 51 to diffuse over a wide range to an extent that the shape of the light source is not visible. The diffusion plate 53 has a total light transmissivity of, for example, at least 20% and no greater than 80%.

In the lighting device configured as described above, the edge of the phosphor sheet 43 is sealed by a cover member in order to allow favorable used of sulfide phosphors, oxide phosphors, and mixed phosphors thereof that are susceptible to degradation by water vapor.

Figure 6:
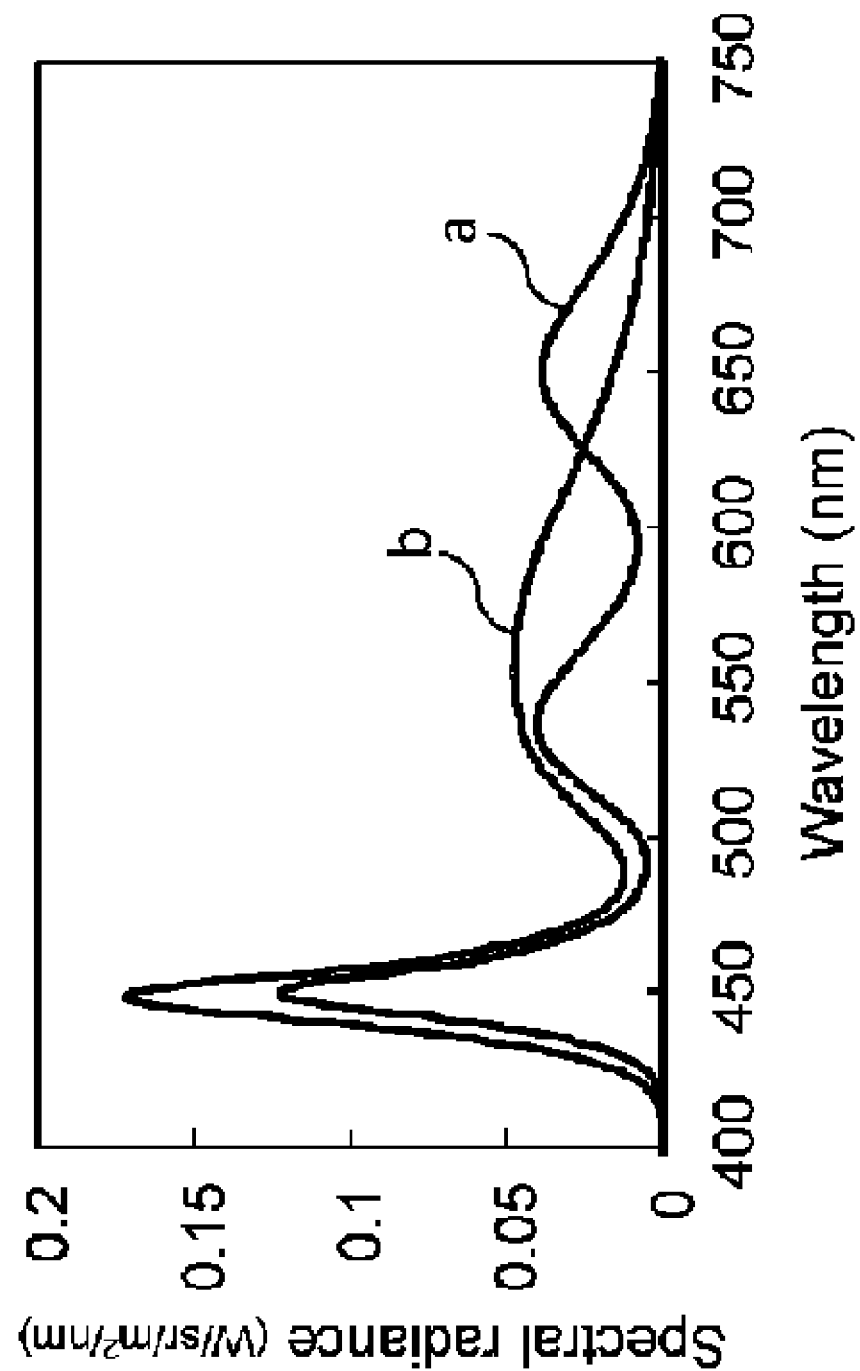
FIG. 6 illustrates spectra for a backlight in which sulfide phosphors were used and a backlight in which a conventional yellow phosphor was used.

FIG. 6 illustrates spectra for a backlight in which sulfide phosphors were used and a backlight in which a conventional yellow phosphor was used. In FIG. 6, "a" indicates the spectrum of the backlight in which the sulfide phosphors were used and "b" indicates the spectrum of the backlight in which the conventional yellow phosphor was used.

Figure 7:
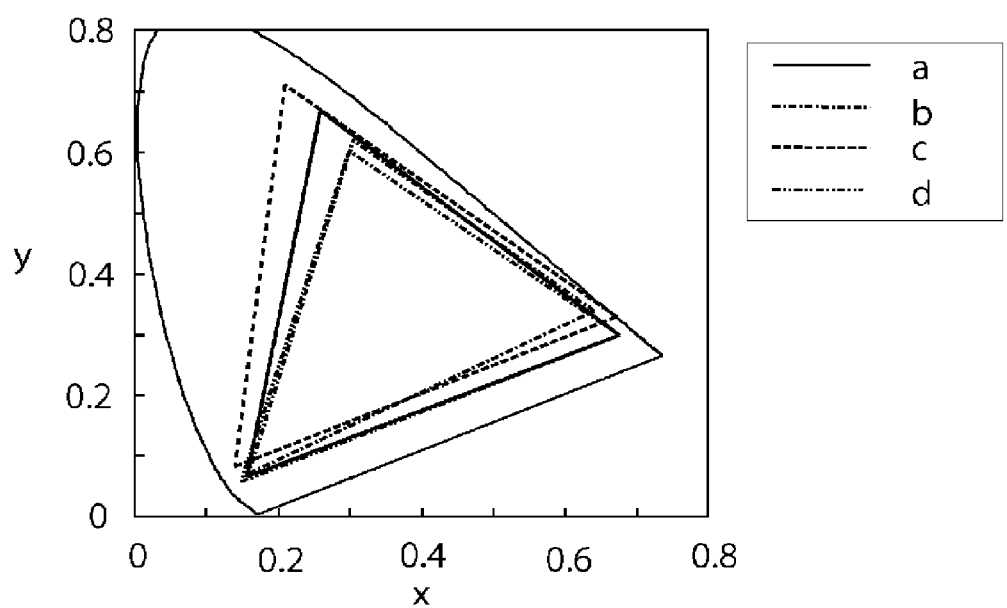
FIG. 7 is a CIE 1931 chromaticity diagram illustrating color spaces for a liquid-crystal display including the backlight in which the sulfide phosphors were used and a liquid-crystal display including the backlight in which the conventional yellow phosphor was used.

FIG. 7 is a CIE 1931 chromaticity diagram illustrating color spaces for a liquid-crystal display including the backlight in which the sulfide phosphors were used and a liquid-crystal display including the backlight in which the conventional yellow phosphor was used. In FIG. 7, "a" indicates the color space of the liquid-crystal display including the backlight in which the sulfide phosphors were used, "b" indicates the color space of the liquid-crystal display including the backlight in which the conventional yellow phosphor was used, "c" indicates an NTSC scheme color space, and "d" indicates an sRGB scheme color space.

In the backlight in which the sulfide phosphors were used, a green sulfide phosphor ($SrGa_2S_4$:Eu) and a red sulfide phosphor (CaS:Eu) were used as the sulfide phosphors, and a phosphor sheet was used in which the sulfide phosphors were dispersed in a styrene-ethylene-butylene-styrene block (SEBS) resin.

As illustrated in FIG. 6, the spectrum "a" of the backlight in which the sulfide phosphors were used had a greater intensity near 650 nm than the spectrum "b" of the backlight in which the yellow phosphor was used as a consequence of the phosphor sheet in which the sulfide phosphors were used containing the red sulfide phosphor. Moreover, as illustrated in FIG. 7, the color space of the liquid-crystal display including the backlight in which the sulfide phosphors were used had an area ratio of approximately 85% to 90% relative to the NTSC scheme color space, whereas the color space of the liquid-crystal display including the backlight in which the yellow phosphor was used had an area ratio of approximately 72% relative to the NTSC scheme color space. The area ratio is determined by the product of the backlight spectrum and the spectral transmittance of a color filter inside the liquid-crystal display. It will be appreciated that the value of the area ratio may be somewhat larger or smaller depending on the spectral transmittance of the color filter.

As described above, phosphor sheets in which sulfide phosphors are used can express a wide color gamut. Therefore, a technique such as described in the present embodiment for sealing the edge of a phosphor sheet with a cover member in order to prevent infiltration of water vapor is extremely useful for phosphor sheets in which sulfide phosphors are used. Furthermore, by providing a lighting device including a phosphor sheet in which a sulfide phosphor is used in, for example, a liquid-crystal panel forming a display screen of a liquid-crystal display, not only can a wide color gamut be expressed, but also the life of the liquid-crystal display can be extended.

Note that present disclosure is not limited to the embodiments described above and various modifications may of course be made without deviating from the essence of the present disclosure. For example, although the previously described embodiment provided an example in which the lighting device is used as a backlight-type light source for a display, the lighting device may alternatively be used as a light source for lighting. In a situation in which the lighting device is used as a light source for lighting, the optical films 44 can normally be omitted. Furthermore, the phosphor-containing resin may have a three-dimensional shape such as a cup-like shape instead of having a flat sheet shape.

EXAMPLES

4. Examples

The following provides a specific explanation of the present disclosure through examples. In the present examples, sealing tapes having different configurations were prepared. Evaluation of tape width misalignment, air bubble inclusion, and creasing was performed for when each of the sealing tapes was affixed to the edge of a phosphor sheet and was folded to seal the edge. However, the present disclosure is in no way limited to these examples.

The phosphor sheet included a phosphor layer of approximately 40 μm in thickness sandwiched between water vapor barrier films and had a 65-inch size (1450 mm×820 mm). The thickness of the phosphor sheet was approximately 130 μm.

Evaluation of tape width misalignment, air bubble inclusion, and creasing was carried out as described below.

[Evaluation of Tape Width Misalignment]

A sealing tape of approximately 6 mm in width was used to seal the edge of a phosphor sheet. The tape width at the edge of the phosphor sheet was measured and front/rear tape width misalignment was evaluated. An evaluation of "good" was given when the tape width was within 3±0.5 mm and an evaluation of "poor" was given when the tape width was not within 3±0.5 mm.

[Evaluation of Air Bubble Inclusion]

A sealing tape of approximately 6 mm in width was used to seal the edge of a phosphor sheet. The sealing tape was observed and an evaluation of "good" was given when included air bubbles were less than 1 mm², whereas an evaluation of "poor" was given when included air bubbles were 1 mm² or greater.

[Evaluation of Creasing]

A sealing tape of approximately 6 mm in width was used to seal the edge of a phosphor sheet. The sealing tape was observed after folding the phosphor sheet and an evaluation of "good" was given when creasing did not occur, whereas an evaluation of "poor" was given when creasing occurred.

Comparative Example 1

Figure 8:
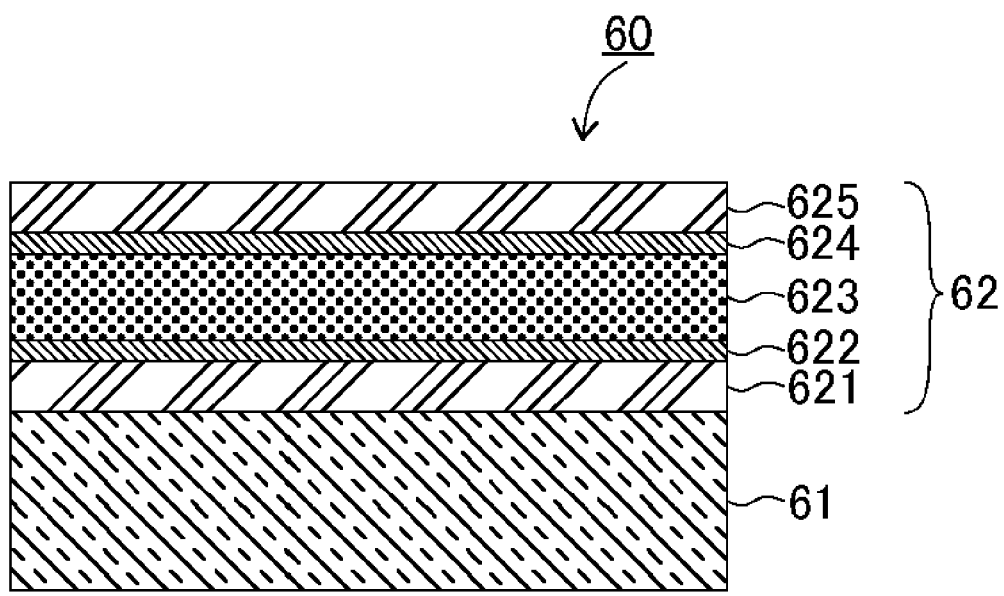
FIG. 8 is a schematic cross-sectional view illustrating tape structure in Comparative Example 1.

FIG. 8 is a schematic cross-sectional view illustrating tape structure in Comparative Example 1. A sealing tape 60 in Comparative Example 1 included an adhesive layer 61 and a gas barrier layer 62. The adhesive layer 61 was an acrylic adhesive layer of approximately 25 μm in thickness. The gas barrier layer 62 included an aluminum layer 621 of approximately 7 μm in thickness, a bonding layer 622 of approximately 3 μm in thickness, a PET film 623 of approximately 12 μm in thickness, a bonding layer 624 of approximately 3 μm in thickness, and an aluminum layer 625 of approximately 7 μm in thickness laminated in stated order.

The tape structure in Comparative Example 1 was subjected to slitting to a width of approximately 6 mm to obtain a sealing tape of Comparative Example 1. The sealing tape of Comparative Example 1 was used to seal the edge of a phosphor sheet.

Figure 9:
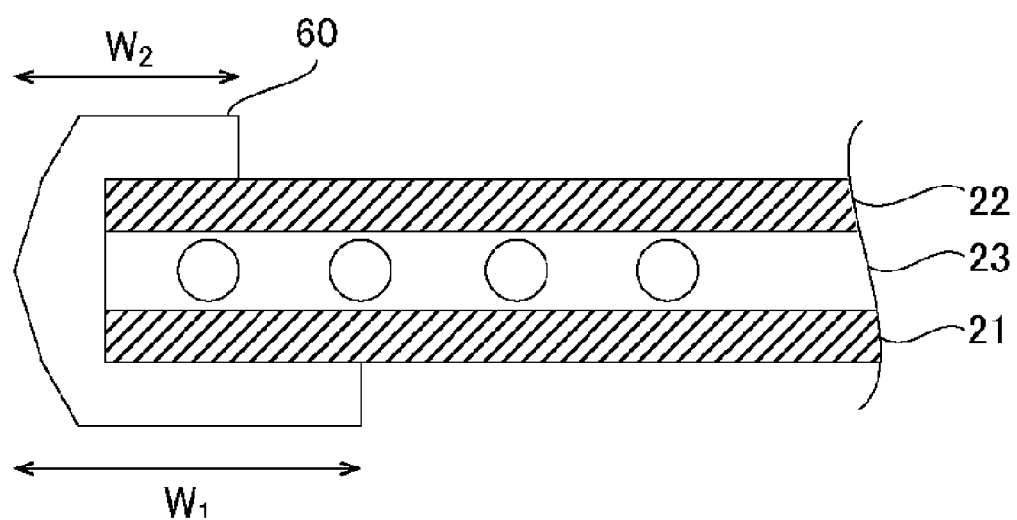
FIG. 9 is a schematic cross-sectional view illustrating tape width misalignment.
Figure 10:
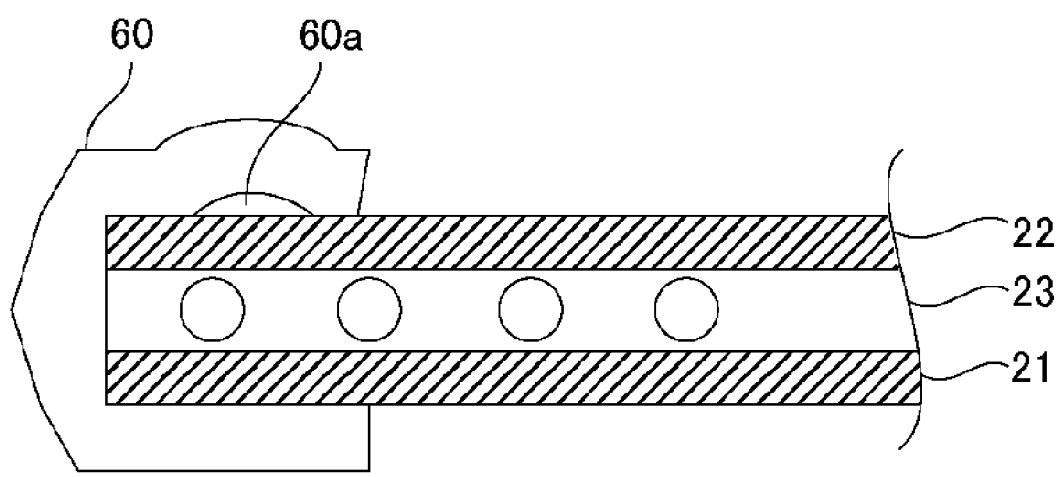
FIG. 10 is a schematic cross-sectional view illustrating air bubble inclusion.

As shown in Table 1, tape width misalignment, air bubble inclusion, and creasing were each evaluated as poor in Comparative Example 1. When using the sealing tape of Comparative Example 1, it was difficult to clearly determine a folding position, which resulted in significant misalignment of front and rear tape widths $W_1$ and $W_2$ as illustrated in FIG. 9. Also, when using the sealing tape of Comparative Example 1, inclusion of an air bubble 60a occurred as illustrated in FIG. 10 due to softness of the sealing tape. Furthermore, when the phosphor sheet was folded, bending of the phosphor sheet caused creasing of the tape part.

Comparative Example 2

Figure 11:
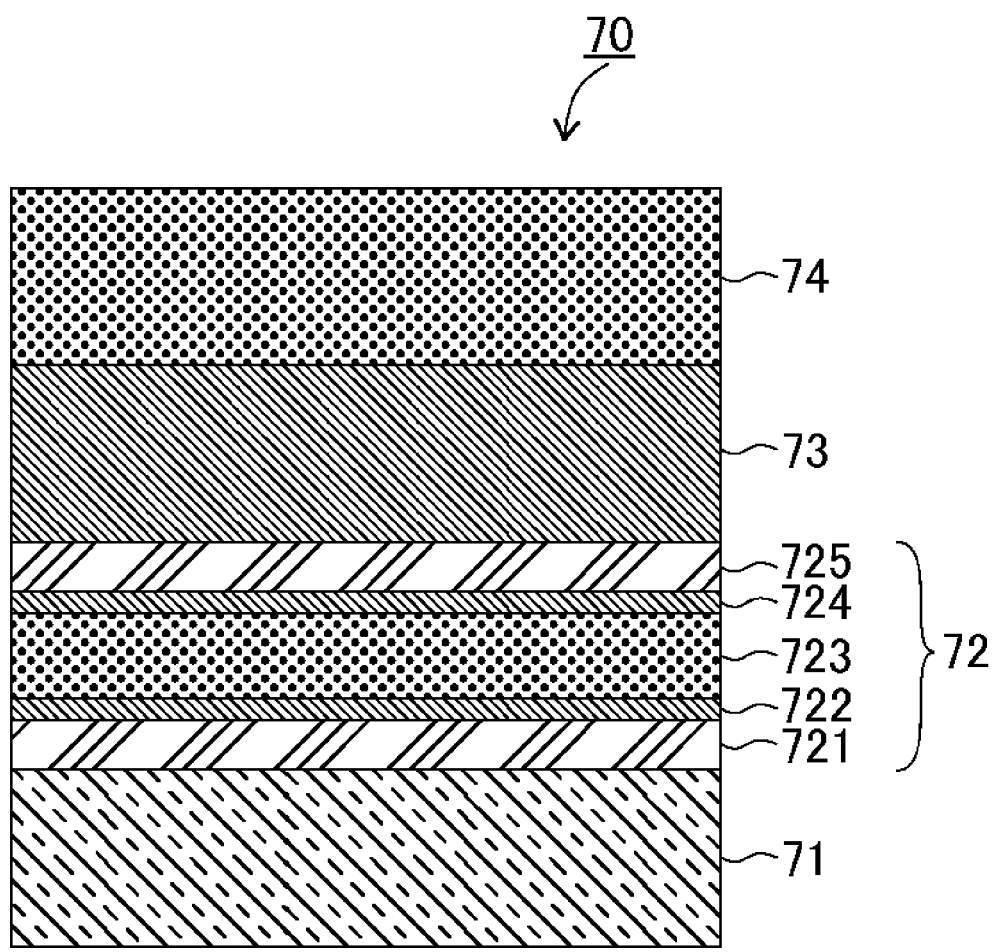
FIG. 11 is a schematic cross-sectional view illustrating tape structure in Comparative Example 2.

FIG. 11 is a schematic cross-sectional view illustrating tape structure in Comparative Example 2. A sealing tape 70 in Comparative Example 2 included an adhesive layer 71, a gas barrier layer 72, a bonding layer 73, and a support film layer 74. The adhesive layer 71 was an acrylic adhesive layer of approximately 25 μm in thickness. The gas barrier layer 72 included an aluminum layer 721 of approximately 7 μm in thickness, a bonding layer 722 of approximately 3 μm in thickness, a PET film 723 of approximately 12 μm in thickness, a bonding layer 724 of approximately 3 μm in thickness, and an aluminum layer 725 of approximately 7 μm in thickness laminated in stated order. The bonding layer 73 was a thermoplastic resin layer of approximately 25 μm in thickness. The support film layer 74 was a PET film of approximately 25 μm in thickness.

The tape structure in Comparative Example 2 was subjected to slitting to a width of approximately 6 mm to obtain a sealing tape of Comparative Example 2. The sealing tape of Comparative Example 2 was used to seal the edge of a phosphor sheet.

Figure 12:
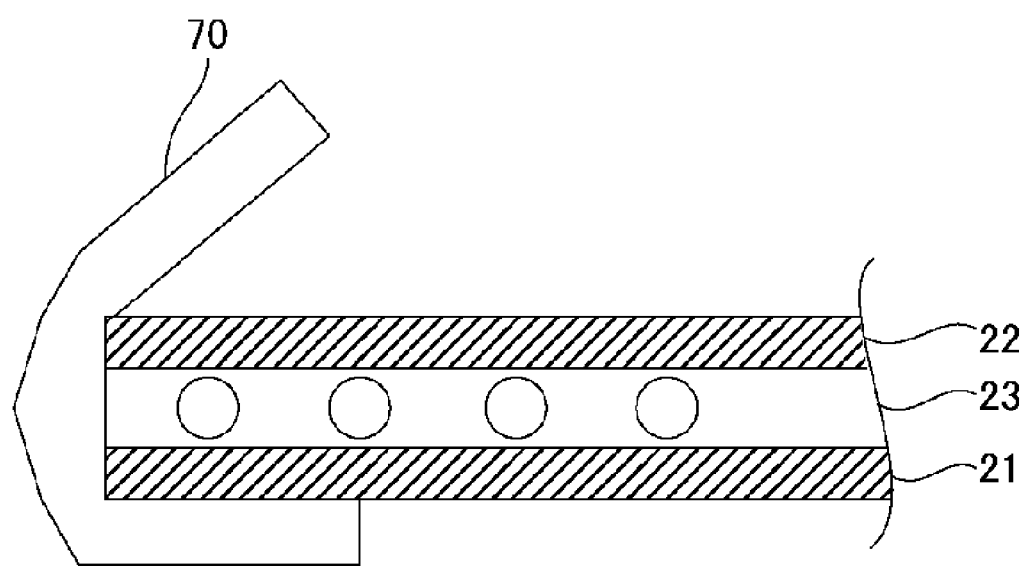
FIG. 12 is a schematic cross-sectional view illustrating a state in which folding is not possible.

As shown in Table 1, it was not possible to evaluate tape width misalignment, air bubble inclusion, and creasing in Comparative Example 2. As illustrated in FIG. 12, it was not possible to fold the sealing tape of Comparative Example 2 due to the hard PET film forming the support film layer 74.

However, air bubble inclusion and creasing did not occur in a part of the sealing tape that was affixed.

Example 1

Figure 13:
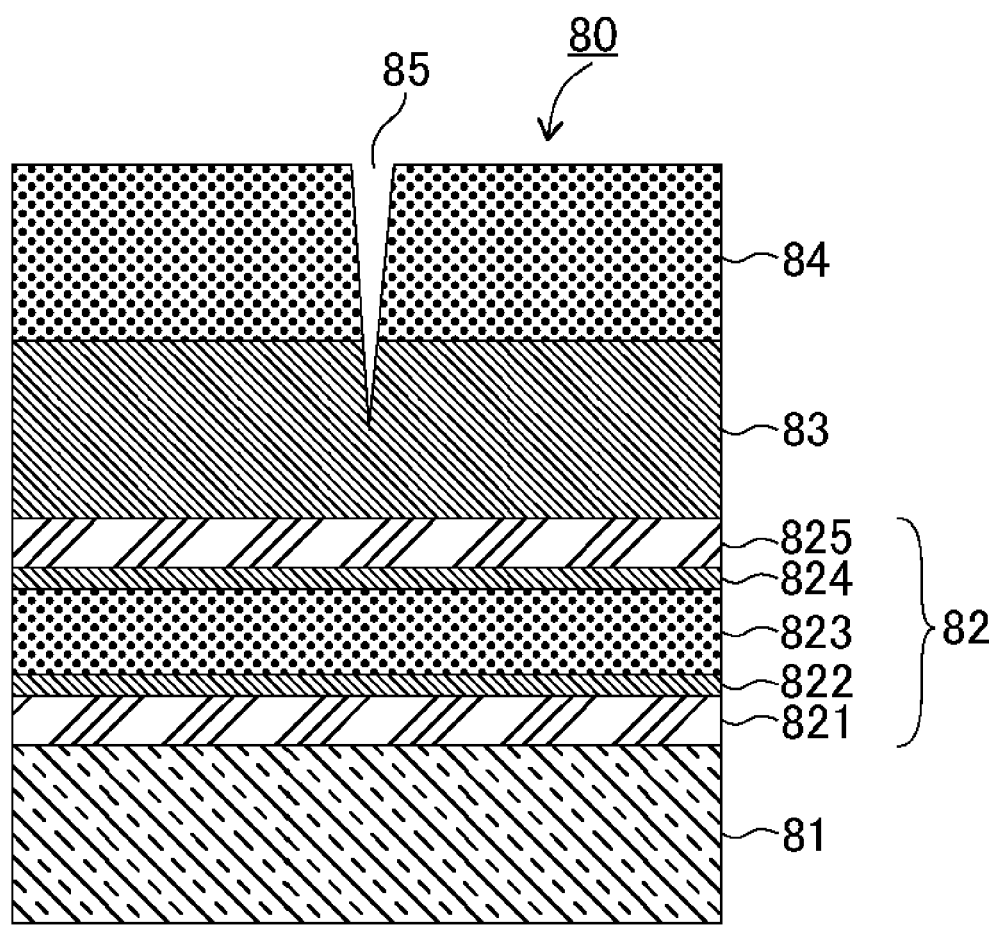
FIG. 13 is a schematic cross-sectional view illustrating tape structure in Example 1.
Figure 14:
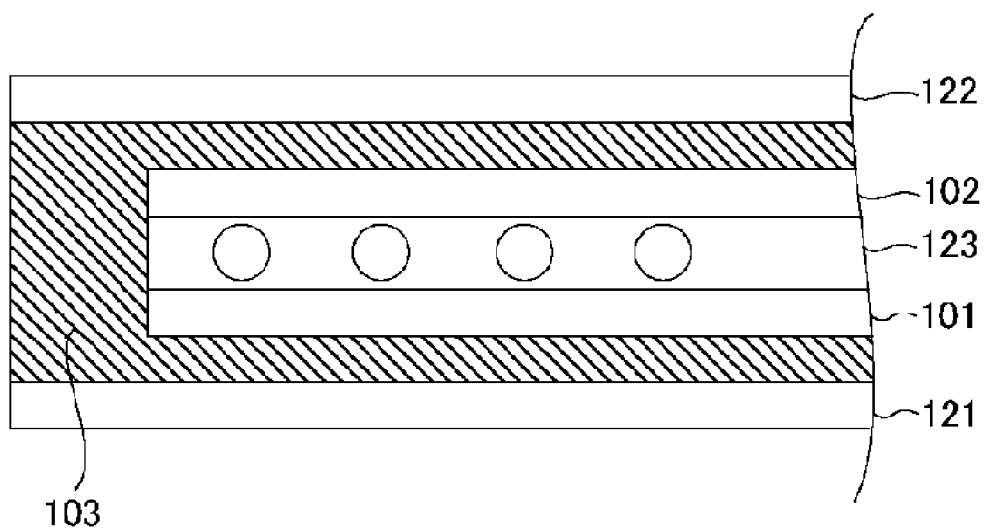
FIG. 14 is a cross-sectional view illustrating a pouch structure of a conventional phosphor sheet.
Figure 15:
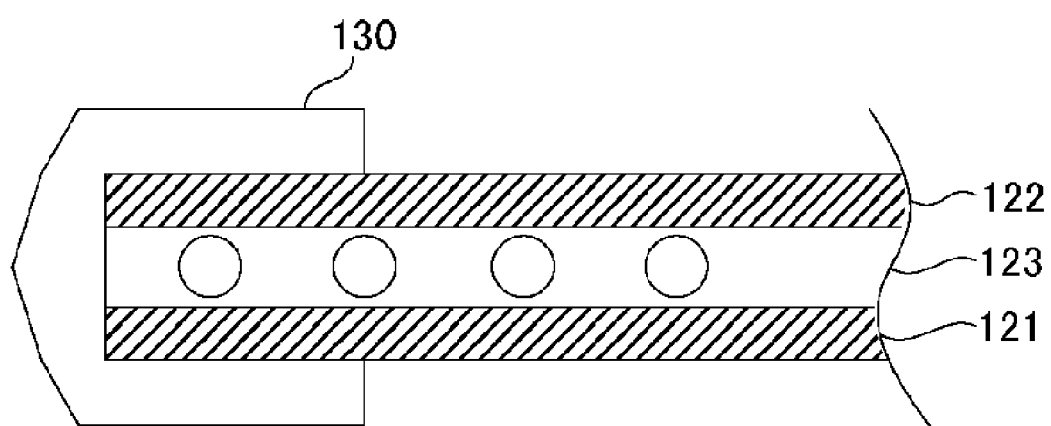
FIG. 15 is a cross-sectional view illustrating a tape sealing structure of a conventional phosphor sheet.

FIG. 13 is a schematic cross-sectional view illustrating tape structure in Example 1. A sealing tape 80 in Example 1 included an adhesive layer 81, a gas barrier layer 82, a bonding layer 83, and a support film layer 84. The adhesive layer 81 was an acrylic adhesive layer of approximately 25 μm in thickness. The gas barrier layer 81 included an aluminum layer 821 of approximately 7 μm in thickness, a bonding layer 822 of approximately 3 μm in thickness, a PET film 823 of approximately 12 μm in thickness, a bonding layer 824 of approximately 3 μm in thickness, and an aluminum layer 825 of approximately 7 μm in thickness laminated in stated order. The bonding layer 83 was a thermoplastic resin layer of approximately 25 μm in thickness. The support film layer 84 was a PET film of approximately 25 μm in thickness.

The tape structure in Example 1 was subjected to slitting to a width of approximately 6 mm and a half cut was subsequently made centrally in the sealing tape. Specifically, an incision was made through the 25-μm PET film at the outermost surface and partway through the bonding layer. The resultant sealing tape was used as a sealing tape of Example 1 in order to seal the edge of a phosphor sheet.

As shown in Table 1, tape width misalignment, air bubble inclusion, and creasing were each evaluated as good in Example 1. When the sealing tape of Example 1 was used, a folding position could be clearly determined as a result of the incision being provided into the PET film forming the support film layer 84, and thus no significant misalignment of tape width at the front and rear occurred. Also, when the sealing tape of Example 1 was used, inclusion of air bubbles did not occur due to the hardness of the PET film forming the support film layer 84. Furthermore, as a result of the hardness of the PET film forming the support film layer, creasing did not occur in the tape part even when the phosphor sheet was folded.

TABLE 1

| | Tape width misalignment | Air bubble inclusion | Creasing |
|---|---|---|---|
| Comparative Example 1 | Poor | Poor | Poor |
| Comparative Example 2 | — | — | — |
| Example 1 | Good | Good | Good |

REFERENCE SIGNS LIST 10 sealing tape
11 adhesive layer
12 gas barrier layer
13 bonding layer
14 support film layer
15 incision
21 first water vapor barrier film
22 second water vapor barrier film
23 phosphor layer
31 red phosphor
32 green phosphor
33 bar coater
34 oven 35 thermal laminator
36 pressing machine
41 blue LED
42 light guide plate
43 phosphor sheet
44 optical film group
51 blue LED
52 substrate
53 diffusion plate
60 sealing tape
61 adhesive layer
62 gas barrier layer
70 sealing tape
71 adhesive layer
72 gas barrier layer
73 bonding layer
74 support film layer
80 sealing tape
81 adhesive layer
82 gas barrier layer
83 bonding layer
84 support film layer
85 incision
101 first film
102 second film
103 sealing resin
121 first water vapor barrier film
122 second water vapor barrier film
123 phosphor layer
130 sealing tape

The invention claimed is:

1. A sealing tape comprising:
an adhesive layer, a gas barrier layer, a bonding layer, and support film layer laminated in stated order; and
an incision into the support film layer in a thickness direction, the incision being located substantially centrally in a width direction and extending in a longitudinal direction.

2. The sealing tape of claim 1, wherein
the incision located substantially centrally in the width direction and extending in the longitudinal direction passes entirely through the support film layer in the thickness direction.

3. The sealing tape of claim 2, wherein
the incision located substantially centrally in the width direction and extending in the longitudinal direction passes partway through the bonding layer in the thickness direction.

4. The sealing tape of claim 1, wherein
the gas barrier layer includes an aluminum layer, a bonding layer, a substrate, a bonding layer, and an aluminum layer laminated in stated order.

5. The sealing tape of claim 1, wherein
the gas barrier layer includes a metal oxide layer, a bonding layer, a substrate, a bonding layer, and a metal oxide layer laminated in stated order.

6. The sealing tape of claim 1, wherein
the bonding layer contains a phosphor.

7. The sealing tape of claim 1, wherein
the support film layer is made from one or more from among a polyester, a polyolefin, a polyarylate, a polycarbonate, a polyacrylate, and a polyethersulfone.

8. The sealing tape of claim 1, wherein
the support film layer has a thickness of at least 10 μm and no greater than 50 μm.

9. The sealing tape of claim 1, wherein
the bonding layer has a thickness of at least 10 μm and no greater than 50 μm.

10. A phosphor sheet comprising:
a first water vapor barrier film;
a second water vapor barrier film;
a phosphor layer sandwiched between the first water vapor barrier film and the second water vapor barrier film; and
a sealing tape sealing edges of the first water vapor barrier film and the second water vapor barrier film, wherein
the sealing tape includes an adhesive layer, a gas barrier layer, a bonding layer, and a support film layer laminated in stated order, and has an incision into the support film layer in a thickness direction, the incision being located substantially centrally in a width direction and extending in a longitudinal direction.

11. The phosphor sheet of claim 10, wherein
the bonding layer of the sealing tape contains a phosphor.

12. The phosphor sheet of claim 11, wherein
the phosphor layer contains a phosphor through which white light is obtained from blue light, and
the phosphor includes a yellow phosphor.

13. The phosphor sheet of claim 10, wherein
the phosphor layer contains a sulfide phosphor.

14. The phosphor sheet of claim 13, wherein
the phosphor layer contains a red phosphor and a green phosphor.

15. A lighting device comprising the phosphor sheet of claim 10.

16. A liquid-crystal display comprising the phosphor sheet of claim 10.

17. A method for manufacturing a phosphor sheet comprising
sandwiching a phosphor layer between a first water vapor barrier film and a second water vapor barrier film, and affixing a sealing tape to edges of the first water vapor barrier film and the second water vapor barrier film, wherein
the sealing tape includes an adhesive layer, a gas barrier layer, a bonding layer, and a support film layer laminated in stated order, and has an incision into the support film layer in a thickness direction, the incision being located substantially centrally in a width direction and extending in a longitudinal direction.

* * * * *